United States Patent
Fukaya et al.

(10) Patent No.: US 6,316,094 B1
(45) Date of Patent: Nov. 13, 2001

(54) CUBIC BORON NITRIDE SINTERED BODY

(75) Inventors: Tomohiro Fukaya; Satoru Kukino; Junichi Shiraishi, all of Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/357,970

(22) Filed: Jul. 21, 1999

(30) Foreign Application Priority Data

Jul. 22, 1998 (JP) .................................................. 10-223679
Jul. 22, 1998 (JP) .................................................. 10-223680

(51) Int. Cl.[7] .............................. B24D 3/00; C04B 35/00
(52) U.S. Cl. ........................... 428/323; 428/403; 428/404; 428/332; 428/697; 428/698; 428/699; 428/704
(58) Field of Search ................................ 501/11, 27, 153, 501/134, 87, 93, 96.4; 428/403, 404, 221, 323, 332, 325, 328, 319

(56) References Cited

U.S. PATENT DOCUMENTS 5,639,285 * 6/1997 Yao et al. ............................... 51/307

FOREIGN PATENT DOCUMENTS

| | | |
|---|---|---|
| 0 712 941 | 5/1996 | (EP) . |
| 0 879 806 | 11/1998 | (EP) . |
| 2 320 725 | 7/1998 | (GB) . |
| 58-060678 | 4/1983 | (JP) . |
| 58-060679 | 4/1983 | (JP) . |
| 62-25630 | 6/1987 | (JP) . |
| 62-25631 | 6/1987 | (JP) . |
| 5-186272 | 7/1993 | (JP) . |

* cited by examiner

Primary Examiner—Deborah Jones
Assistant Examiner—Jennifer McNeil
(74) Attorney, Agent, or Firm—McDermott, Will & Emery

(57) ABSTRACT

A cBN sintered body superior in chipping resistance. The cBN sintered body is a sintered body in which cBN particles are bonded through a bonding phase. The bonding phase has a two-dimensionally continuous structure. The bonding phase comprises at least one kind selected from the group consisting of (a) carbide, nitride, carbonitride, or boride of a 4a-, 5a-, or 6a-group transition metal in the periodic table; (b) nitride, boride, or oxide of Al; (c) at least one kind of carbide, nitride, carbonitride, and boride of Fe, Co, or Ni; and (d) a mutual solid solution of those. The percentage of cBN content is 45 to 70% in volume. The bonding phase has the thickness of which the average value is 1.5 μm or less and the standard deviation is 0.9 μm or less with the cBN particles having an average particle size of 2 to 6 μm inclusive. The bonding phase has the thickness of which the average value is 1.0 μm or less and the standard deviation is 0.7 μm or less with the cBN particles having an average particle size of not less than 0.01 μm and less than 2.0 μm.

4 Claims, No Drawings

CUBIC BORON NITRIDE SINTERED BODY

BACKGROUND OF THE INVENTION

1. Field of the Invention

The present invention relates to a cubic boron nitride (cBN) sintered body, particularly to a cBN sintered body for use in cutting tools that are improved in wear resistance and chipping resistance.

2. Description of the Background Art

Because cBN is the substance next to diamond in hardness, cBN-base sintered bodies have been used in cutting tools, wear-resistant parts, impact-resistance parts, etc. This type of sintered body has difficulty in achieving both high hardness and high strength. Published Japanese patent applications Tokukosho 62-25630, Tokukosho 62-25631, and Tokukaihei 5-186272 have disclosed techniques aiming at the achievement of the compatibility of hardness and strength. The disclosed techniques, however, have not necessarily been sufficient in the compatibility of hardness and strength. For instance, single point tools comprising the foregoing sintered body, when used in high-speed cutting, allow the flank wear and crater wear to sharpen the cutting edge, resulting in easy chipping of the cutting edge. Even with ordinary cutting speeds, the tools tend to suffer chipping of the cutting edge from an impact when used in applications where strong impacts are applied as in interrupted cutting. Those drawbacks have lead to unstable tool life.

SUMMARY OF THE INVENTION

An object of the present invention is to offer a cBN sintered body superior in chipping resistance resulting from the optimization of the crater-wear resistance and mechanical strength. Another object of the present invention is to offer a cBN sintered body superior in chipping resistance resulting from the optimization of the impact resistance and mechanical strength.

The first sintered body that the present invention offers is a sintered body in which cBN particles are bonded through a bonding phase. The bonding phase has a two-dimensionally continuous structure. The bonding phase comprises at least one material selected from the group consisting of (a) carbide, nitride, carbonitride, or boride of a IVB-, VB-, or VIB group transition metal in the periodic table; (b) nitride, boride, or oxide of Al; (c) at least one kind of carbide, nitride, carbonitride, and boride of Fe, Co, or Ni; and (d) a mutual solid solution of those. The bonding phase has the thickness of which the average value is 1.5 $\mu$m or less and the standard deviation is 0.9 $\mu$m or less. In the above description, the thickness of the bonding phase means the distance between cBN particles on an arbitrarily drawn straight line in a sintered body. The percentage of the cBN content is 45 to 70% in volume. The cBN particles have an average particle size of 2 to 6 $\mu$m inclusive. The average particle size means the particle diameter at which the cumulative volume percentage reaches 50%.

The second sintered body that the present invention offers is a sintered body in which cBN particles are bonded through a bonding phase. The bonding phase has a two-dimensionally continuous structure. The bonding phase comprises at least one material selected from the group consisting of (a) carbide, nitride, carbonitride, or boride of a IVB-, VB-, or VIB group transition metal in the periodic table; (b) nitride, boride, or oxide of Al; (c) at least one kind of carbide, nitride, carbonitride, and boride of Fe, Co, or Ni; and (d) a mutual solid solution of those. The bonding phase has the thickness of which the average value is 1.0 $\mu$m or less and the standard deviation is 0.7 $\mu$m or less. In the above description, the thickness of the bonding phase means the distance between cBN particles on an arbitrary straight line in a sintered body. The percentage of the cBN content is 45 to 70% in volume. The cBN particles have an average particle size of not less than 0.01 $\mu$m and less than 2.0 $\mu$m. The average particle size means the particle diameter at which the cumulative volume percentage reaches 50%.

Conventional cBN sintered bodies have had a bonding phase with the thickness that varies considerably, producing portions in which the bonding phase alone constitutes a large volume. Because those portions are mechanically weak portions (defects) in a sintered body, cracks are prone to develop from those portions, resulting in an insufficient chipping resistance of the tool.

High-speed cutting in particular reduces the material strength because of the high temperature in a cutting edge. High-speed cutting also develops crater wear, sharpening the cutting edge and thus reducing the strength of the cutting edge. Such a condition allows at the crater-wear portion the generation of cracks, parallel to the cutting edge, caused by impacts applied to the cutting edge. The cracks grow by the interrupted applications of impacts, resulting in chipping.

Even with ordinary cutting speeds, an impact concentrates stresses at the foregoing defective portion when a tool is used in applications where impacts are applied as in intermittent cutting. This stress concentration generates a fracture at this mechanically-weak defective portion, resulting in the chipping of the cutting edge.

Considering the foregoing failure mechanism, the sintered body of the present invention is intended to improve the chipping resistance by reducing the thickness variations of the bonding phase in comparison with the conventional sintered bodies so that defective portions are diminished. When the average value and standard deviation of the thickness of a bonding phase exceed the foregoing specified values, the portions of which a large volume is constituted only by the bonding phase increase, decreasing the improving effectiveness on the chipping resistance. It is desirable that the bonding phase have a lower limit of about 0.2 $\mu$m in the average thickness in order to exert its functions.

If cBN particles have an excessively small diameter, the particles lose the heat resistance to allow easy development of wear; if an excessively large diameter, the cBN particles themselves cleave from an impact to allow chipping of the cutting edge, permitting the tool to lose the chipping resistance. Consequently, the first sintered body of the present invention should have the cBN particles with a particle size of 2 to 6 $\mu$m in order to be superior in heat resistance and suitable for high-speed cutting. Similarly, the second sintered body of the present invention should have the cBN particles with a particle size of not less than 0.01 $\mu$m and less than 2.0 $\mu$m in order to be superior in impact resistance.

The sintering material of the present invention can be obtained by coating cBN with a bonding phase material or by mixing materials with a special method. The coating of a bonding phase material is performed by one of the following methods:

(a) chemical vapor deposition (CVD) method, physical vapor deposition (PVD) method, or electroless plating before the sintering or (b) utilization of mechanochemical reaction induced by compressive shearing force, frictional force, and impact force at the time of mechanical mixing.

The special mixing method is most suitably provided by the ultrasonic mixing method or by a dispersant-aided ball-mill (BM) method.

The sintering process for the sintering material of the present invention is carried out by plasma sintering equipment, hot-press equipment, or ultrahigh-pressure sintering equipment, for example.

BRIEF DESCRIPTION OF THE PREFERRED EMBODIMENTS

Embodiments of the present invention are described below.

EXAMPLE 1

The following materials were mixed: 76 wt. % titanium nitride, 18 wt. % Al, 3 wt. % Co, and 3 wt. % Ni. The mixture was heat-treated at 1200° C. for 30 minutes in a vacuum to obtain a compound. The compound was pulverized to produce a bonding-material powder. The bonding-material powder exhibited peaks of TiN, $Ti_2AlN$, $TiAl_3$, etc. in X-ray diffraction (XRD). The bonding-material powder and a cBN powder having an average particle size of 3 $\mu$m were mixed for the cBN to constitute 60 vol. % by the methods described in Table 1. Detailed conditions of the mixing methods are described below. No. 2 employed the RF spattering method for coating the cBN particles with TiN. The coating has an average thickness of 50 nm. Mixing was carried out without using a dispersant in No. 2.

The ultrasonic mixing was conducted by adding a cBN powder and a bonding-material powder into ethyl alcohol to be mixed by the action of ultrasonic vibrations at 20 kHz. The BM mixing was conducted by placing a cBN powder and a bonding-material powder into a pot together with balls having a diameter of 10 mm to be wet-mixed in ethyl alcohol at 250 rpm for 800 minutes. The dispersant used was 2 wt. % polyvinyl alcohol.

The mixed powders were sintered at an ultrahigh pressure and a high temperature as high as 5 GPa and 1300° C. respectively. All the sintered bodies exhibited cBN, TiN, $TiB_2$, $AlB_2$, AlN, $Al_2O_3$, and WC in XRD.

The structures of the sintered bodies were photographed under a metallurgical microscope at 1,500 power to observe blackish cBN particles and a whitish bonding phase. The thickness of the bonding phase was measured by drawing an arbitrary straight line on those photographs. The thickness of the bonding phase, or the distance between cBN particles, was measured at 20 or more places on the line to obtain the average of the measurements. The obtained average values and standard deviations are shown in Table 1.

The sintered bodies were processed into cutting tools. The tools were then subjected to the cutting test under the conditions described below to measure the life, the time span until the chipping occurs. The results are shown in Table 1.

Cutting test conditions:

Material to be cut: SCM415, HRC58-62, size: 100 mm in diameter and 300 mm length, shape: Six V-shaped grooves are provided longitudinally, Tool shape: SNG432 chamfer honing (−25°, 0.15–0.2 mm)

Holder: FN11R

Cutting conditions: V: 180 m/min, d: 0.3 mm, f: 0.15 mm/rev, condition: dry.

TABLE 1

| No. | Mixing method | Thickness of the bonding phase Average value ($\mu$m) | Thickness of the bonding phase Standard deviation ($\mu$m) | Tool life (min.) |
|---|---|---|---|---|
| 1 | Ultrasonic mixing method | 1.3 | 0.85 | 50 |
| 2 | BM method in which cBN particles were coated with TiN before being mixed with the bonding-material powder | 1.2 | 0.8 | 55 |
| 3 | BM method using a dispersant | 1.2 | 0.84 | 52 |
| 4 | BM method without using a dispersant | 1.3 | 1.1 | 21 |
| 5 | Mixing by an attritor | 1.2 | 1.0 | 25 |

The results clearly show that the tool life was prolonged about twofold when particles having an average particle size of 3 $\mu$m were bonded by a bonding phase having an average value of not more than 1.5 $\mu$m and a standard deviation of not more than 0.9 $\mu$m in thickness. The results also demonstrate that it is desirable to use the ultrasonic mixing method or the dispersant-aided ball mill method when the bonding-material powder is mixed with the cBN powder in order to produce the sintered body having the bonding phase with the foregoing thickness. It is also effective to coat the cBN particles with a bonding-phase material.

EXAMPLE 2

A bonding-material powder was produced by the same method as in Example 1. The bonding-material powder and a cBN powder having an average particle size of 1 $\mu$m were mixed for the cBN to constitute 60 vol. % by the methods described in Table 2. Detailed conditions of the mixing methods are described below. No. 7 employed the RF spattering method for coating the cBN particles with TiN. The coating had an average thickness of 40 nm. Mixing was carried out without using a dispersant in No. 7.

The ultrasonic mixing was conducted by adding a cBN powder and a bonding-material powder into acetone to be mixed by the action of ultrasonic vibrations at 23.5 kHz. The BM mixing was conducted by placing a cBN powder and a bonding-material powder into a pot together with balls having a diameter of 10 mm to be wet-mixed in ethyl alcohol at 235 rpm for 340 minutes. The dispersant used was 1.5 wt. % polyvinyl alcohol.

The mixed powders were sintered at an ultrahigh pressure and a high temperature as high as 5 GPa and 1300° C. respectively. All the sintered bodies exhibited cBN, TiN, $TiB_2$, $AlB_2$, AlN, $Al_2O_3$, and WC in XRD.

The structures of the sintered bodies were observed to measure the thickness of the bonding phase by the same method as in Example 1. The obtained average values and standard deviations are shown in Table 2.

The sintered bodies were processed into cutting tools. The tools were then subjected to the cutting test under the conditions described below to measure the life, the time span until the chipping occurs. The results are shown in Table 2.

Cutting test conditions:

Material to be cut: SCM415, HRC58-62, size: 100 mm in diameter and 300 mm in length, shape: Six V-shaped grooves are provided longitudinally, Tool shape: SNGM20408 chamfer honing (−25°, 0.15–0.2 mm)

Holder: FN11R,

Cutting conditions: V: 100 m/min, d: 0.2 mm, f: 0.13 mm/rev, condition: dry.

TABLE 2

| No. | Mixing method | Thickness of the bonding phase | | Tool life (min.) |
|---|---|---|---|---|
| | | Average value ($\mu$m) | Standard deviation ($\mu$m) | |
| 6 | Ultrasonic mixing method | 0.7 | 0.45 | 50 |
| 7 | BM method in which cBN particles were coated with TiN before being mixed with the bonding-material powder | 0.8 | 0.50 | 55 |
| 8 | BM method using a dispersant | 0.7 | 0.52 | 52 |
| 9 | BM method without using a dispersant | 0.8 | 0.75 | 21 |
| 10 | Mixing by an attritor | 0.7 | 0.79 | 25 |

The results clearly show that the tool life was prolonged about twofold when cBN particles having an average particle size of 1 $\mu$m were bonded by a bonding phase having an average value of not more than 1.0 $\mu$m and a standard deviation of not more than 0.7 $\mu$m in thickness. The results also demonstrate that it is desirable to use the ultrasonic mixing method or the dispersant-aided ball mill method when the bonding-material powder is mixed with the cBN powder in order to produce the sintered body having the bonding phase with the foregoing thickness.

EXAMPLE 3

The following materials were mixed: 75 wt. % titanium nitride, 22 wt. % Al, 2 wt. % Co, and 1 wt. % Ni. The mixture was heat-treated at 1240° C. for 32 minutes in a vacuum to obtain a compound. The compound was pulverized to produce a bonding-material powder. The bonding-material powder exhibited peaks of TiN, $Ti_2AlN$, $TiAl_3$, etc. in XRD. The bonding-material powder and a cBN powder having an average particle size of 4.8 $\mu$m were mixed for the cBN to constitute 65 vol. % by the ultrasonic mixing method and by a dispersant-unaided ball mill (BM) method. Detailed conditions of the mixing methods are described below.

The ultrasonic mixing was conducted by adding a cBN powder and a bonding-material powder into acetone to be mixed by the action of ultrasonic vibrations at 25 kHz. The BM mixing was conducted by placing a cBN powder and a bonding-material powder into a pot together with balls having a diameter of 10 mm to be wet-mixed in ethyl alcohol at 200 rpm for 600 minutes.

The mixed powders were sintered at an ultrahigh pressure and a high temperature as high as 4.85 GPa and 1310° C. respectively. All the sintered bodies exhibited cBN, TiN, $TiB_2$, $AlB_2$, AlN, $Al_2O_3$, and WC in XRD. The structures of the sintered bodies were observed by the methods described below. The thickness of the bonding phase was measured by the same method as in Example 1 for each observed method described below.

(1) The structures were photographed under a metallurgical microscope at 1,500 power to observe blackish cBN particles and a whitish bonding phase. The thickness of the bonding phase was measured by drawing an arbitrary straight line on the photographs.

(2) The structures were photographed under a scanning electron microscope (SEM) at 3,000 power to observe cBN particles and a bonding phase. The thickness of the bonding phase was measured by drawing an arbitrary straight line on the photographs.

(3) The structures were photographed under a transmission electron microscope (TEM) at 10,000 power to observe cBN particles and a bonding phase. The thickness of the bonding phase was measured by drawing an arbitrary straight line on the photographs.

(4) The structures were photographed by Auger electron spectroscopy (AES) at 10,000 power to observe cBN particles and a bonding phase. The thickness of the bonding phase was measured by drawing an arbitrary straight line on the photographs.

(5) The structures were photographed under a metallurgical microscope at 1,500 power to observe blackish cBN particles and a whitish bonding phase. The photographs were processed by image analysis. The image was two-level quantized in such a manner that the percentage of the area of the blackish portions, which correspond to the cBN particles, became equal to the percentage of the cBN content in volume. Then the portions corresponding to the bonding phase were determined to measure the thickness of the bonding phase.

(6) The structures were photographed under a metallurgical microscope at 1,000 power to observe blackish cBN particles and a whitish bonding phase. The photographs were processed by image analysis to measure brightness on an arbitrarily drawn straight line. The measured result revealed that the brightness had periodicity. First, the portions of the line were divided into two groups by degree of brightness; one group was darker (corresponding to the cBN particles) than the given degree of brightness; the other group was brighter (corresponding to the bonding phase). Second, the degree of brightness was determined in such a manner that the percentage of the darker portions became equal to the percentage of the cBN content in volume. Finally, the length of the brighter portions was taken as the thickness of the bonding phase. The obtained average values and standard deviations of the thickness of the bonding phase are shown in Table 3.

TABLE 3

| | | Mixing method | | | |
|---|---|---|---|---|---|
| | | Ultrasonic mixing Thickness of the bonding phase | | Ball-mill mixing Thickness of the bonding phase | |
| No. | Measuring method | Average value ($\mu$m) | Standard deviation ($\mu$m) | Average value ($\mu$m) | Standard deviation ($\mu$m) |
| 11 | (1) | 1.2 | 0.7 | 1.2 | 1.3 |
| 12 | (2) | 1.2 | 0.7 | 1.2 | 1.3 |
| 13 | (3) | 1.2 | 0.7 | 1.2 | 1.3 |
| 14 | (4) | 1.2 | 0.7 | 1.2 | 1.3 |
| 15 | (5) | 1.2 | 0.7 | 1.2 | 1.3 |
| 16 | (6) | 1.2 | 0.7 | 1.2 | 1.3 |

The sintered bodies were processed into cutting tools. The tools were then subjected to the cutting test under the conditions described below to measure the life, the time span until the chipping occurs. The sintered bodies mixed by ultrasonic waves have a life of about 20 minutes, and the sintered bodies mixed by the ball-mill method about 5 minutes. The results demonstrate that the ultrasonic mixing method is preferable to the dispersant-unaided ball-mill method for mixing the bonding-material powder.

Cutting test conditions:

Material to be cut: SCM420, HRC59-61, size: 100 mm in diameter and 300 mm in length, shape: Eight V-shaped grooves are provided longitudinally, Tool shape: SNGM20408 chamfer honing (−25°, 0.15–0.2 mm)

Holder: FN11R,

Cutting conditions: V: 150 m/min, d: 0.25 mm, f: 0.11 mm/rev, condition: dry.

EXAMPLE 4

The following materials were mixed: 73 wt. % titanium nitride, 19 wt. % Al, 4 wt. % Co, and 4 wt. % Ni. The mixture was heat-treated at 1240° C. for 32 minutes in a vacuum to obtain a compound. The compound was pulverized to produce a bonding-material powder. The bonding-material powder exhibited peaks of TiN, $Ti_2AlN$, $TiAl_3$, etc. in XRD. The bonding-material powder and a cBN powder having an average particle size of 0.5 μm were mixed for the cBN to constitute 65 vol. % by the ultrasonic mixing method and by the dispersant-unaided ball mill (BM) method. Detailed conditions of the mixing methods are described below.

The ultrasonic mixing was conducted by adding a cBN powder and a bonding-material powder into ethyl alcohol to be mixed by the action of ultrasonic vibrations at 22.3 kHz. The BM mixing was conducted by placing a cBN powder and a bonding-material powder into a pot together with balls having a diameter of 10 mm to be wet-mixed in acetone at 215 rpm for 450 minutes.

The mixed powders were sintered at an ultrahigh pressure and a high temperature as high as 4.85 GPa and 1310° C. respectively. All the sintered bodies exhibited cBN, TiN, $TiB_2$, $AlB_2$, AlN, $Al_2O_3$, and WC in XRD. The sintered bodies were treated by the same methods that are numbered (1) to (6) in Example 3 to measure the thickness of the bonding phase. The obtained average values and standard deviations of the thickness of the bonding phase are shown in Table 4.

TABLE 4

| | | Mixing method | | | |
| | | Ultrasonic mixing Thickness of the bonding phase | | Ball-mill mixing Thickness of the bonding phase | |
| No. | Measuring method | Average value (μm) | Standard deviation (μm) | Average value (μm) | Standard deviation (μm) |
|---|---|---|---|---|---|
| 17 | (1) | 0.8 | 0.6 | 0.8 | 0.8 |
| 18 | (2) | 0.8 | 0.6 | 0.8 | 0.8 |
| 19 | (3) | 0.8 | 0.6 | 0.8 | 0.8 |
| 20 | (4) | 0.8 | 0.6 | 0.8 | 0.8 |
| 21 | (5) | 0.8 | 0.6 | 0.8 | 0.8 |
| 22 | (6) | 0.8 | 0.6 | 0.8 | 0.8 |

The sintered bodies were processed into cutting tools. The tools were then subjected to the cutting test under the conditions described below to measure the life, the time span until the chipping occurs. The sintered bodies mixed by ultrasonic waves have a life of about 20 minutes, and the sintered bodies mixed by the ball-mill method about 5 minutes. The results demonstrate that the ultrasonic mixing method is preferable to the dispersant-unaided ball-mill method for mixing the bonding-material powder.

Cutting test conditions:

Material to be cut: SCM420(JIS Standard), HRC59-61, size: 100 mm in diameter and 300 mm in length, shape: Eight V-shaped grooves are provided longitudinally, Tool shape: SNGN120408 chamfer honing (−25°, 0.15–0.2 mm)

Holder: FN11R,

Cutting conditions: V: 90 m/min, d: 0.23 mm, f: 0.14 mm/rev, condition: dry.

EXAMPLE 5

The following materials were mixed: 80 wt. % titanium nitride and 20 wt. % Al. The mixture was heat-treated at 1200° C. for 30 minutes in a vacuum to obtain a compound. The compound was pulverized to produce a bonding-material powder. The bonding-material powder exhibited peaks of TiN, $Ti_2AlN$, $TiAl_3$, etc. in XRD. The cBN particles having an average particle size of 3.5 μm was coated with the bonding-material powder so that the cBN constituted the volume percentages as shown in Table 5. The coating was carried out by an RF-spattering PVD device. Observation of the coated particles under TEM showed that the cBN particles were virtually uniformly coated with TiN with an average thickness of 50 nm. The TiN-coated cBN particles and the foregoing bonding-material powder were mixed by the ball mill method without using a dispersant. The mixing by the BM method was conducted by placing the cBN powder and a bonding-material powder into a pot together with balls having a diameter of 10 mm to be wet-mixed in acetone at 260 rpm for 650 minutes. The mixed powders were sintered at an ultrahigh pressure and a high temperature as high as 4.8 GPa and 1350° C. respectively. All the sintered bodies exhibited cBN, TiN, $TiB_2$, $AlB_2$, AlN, $Al_2O_3$, and WC in XRD.

The structures of the sintered bodies were photographed under a metallurgical microscope at 1,500 power to observe blackish cBN particles and a whitish bonding phase. The thickness of the bonding phase was measured by drawing an arbitrary straight line on the photographs. The obtained average values and standard deviations of the thickness are shown in Table 5.

The sintered bodies were processed into cutting tools. The tools were then subjected to the cutting test under the conditions described below to measure the life, the time span until the chipping occurs. The obtained results are also shown in Table 5.

Cutting test conditions:

Material to be cut: SCM415, HRC58-62, size: 100 mm in diameter and 300 mm in length, shape: Six V-shaped grooves are provided longitudinally, Tool shape: SNG432 chamfer honing (−25°, 0.15–0.2 mm)

Holder: FN11R,

Cutting conditions: V: 165 m/min, d: 0.19 mm, f 0.125 mm/rev, condition: dry.

TABLE 5

| No. | Volume percentage of cBN content (%) | Thickness of the bonding phase | | Tool life (min.) |
| --- | --- | --- | --- | --- |
| | | Average value (μm) | Standard deviation (μm) | |
| 23 | 40 | 1.8 | 0.8 | 2 |
| 24 | 45 | 1.3 | 0.8 | 26 |
| 25 | 50 | 1.1 | 0.7 | 31 |
| 26 | 60 | 0.9 | 0.7 | 32 |
| 27 | 65 | 0.9 | 0.7 | 31 |
| 28 | 70 | 0.8 | 0.7 | 25 |
| 29 | 75 | 0.6 | 0.7 | 4 |

EXAMPLE 6

The following materials were mixed: 92 wt. % titanium nitride and 18 wt. % Al. The mixture was heat-treated at 1200° C. for 30 minutes in a vacuum to obtain a compound. The compound was pulverized to produce a bonding-material powder. The bonding-material powder exhibited peaks of TiN, $Ti_2AlN$, $TiAl_3$, etc. in XRD. The cBN particles having an average particle size of 1.5 μm was coated with the bonding-material powder so that the cBN constituted the volume percentages as shown in Table 6. The coating was carried out by an RF-spattering PVD device. Observation of the coated particles under TEM showed that the cBN particles were virtually uniformly coated with TiN with an average thickness of 45 nm. The TiN-coated cBN particles and the foregoing bonding-phase powder were mixed by the ball mill method without using a dispersant. The mixing by the BM method was conducted by placing the cBN powder and a bonding-material powder into a pot together with balls having a diameter of 10 mm to be wet-mixed in ethyl alcohol at 235 rpm for 550 minutes. The mixed powders were sintered at an ultrahigh pressure and a high temperature as high as 4.9 GPa and 1380° C. respectively. All the sintered bodies exhibited cBN, TiN, $TiB_2$, $AlB_2$, AlN, $Al_2O_3$, and WC in XRD.

The structures of the sintered bodies were photographed under a metallurgical microscope at 1,500 power to observe blackish cBN particles and a whitish bonding phase. The thickness of the bonding phase was measured by drawing an arbitrary straight line on the photographs. The obtained average values and standard deviations of the thickness are shown in Table 6.

The sintered bodies were processed into cutting tools. The tools were then subjected to the cutting test under the conditions described below to measure the life, the time span until the chipping occurs. The obtained results are also shown in Table 6.

Cutting test conditions:

Material to be cut: SCM415, HRC58-62, size: 100 mm in diameter and 300 mm in length, shape: Six V-shaped grooves are provided longitudinally, Tool shape: SNG432 chamfer honing (−25°, 0.15–0.2 mm)

Holder: FN11R,

Cutting conditions: V: 103 m/min, d: 0.145 mm, f: 0.088 mm/rev, condition: dry.

TABLE 6

| No. | Volume percentage of cBN content (%) | Thickness of the bonding phase | | Tool life (min.) |
| --- | --- | --- | --- | --- |
| | | Average value (μm) | Standard deviation (μm) | |
| 30 | 40 | 1.2 | 0.6 | 3 |
| 31 | 45 | 0.9 | 0.6 | 27 |
| 32 | 50 | 0.9 | 0.5 | 33 |
| 33 | 60 | 0.8 | 0.6 | 34 |
| 34 | 65 | 0.8 | 0.5 | 32 |
| 35 | 70 | 0.7 | 0.5 | 26 |
| 36 | 75 | 0.6 | 0.5 | 2 |

The results obtained in Examples 5 and 6 demonstrate that it is desirable that the percentage of cBN content be 45 to 70 vol. %. Particularly, preferable results were obtained at 50 to 65 vol. %.

EXAMPLE 7

Various material powders were mixed for composing bonding phases. Every mixture was heat-treated at 1230° C. for 32 minutes in a vacuum to obtain a compound. The compound was pulverized to produce a bonding-material powder. The bonding-material powder and a cBN powder having an average particle size of 4.1 μm were mixed for the cBN to constitute 62 vol. % by the dispersant-aided ball mill method. The mixing by the BM method was conducted by placing the cBN powder and a bonding-material powder into a pot together with balls having a diameter of 10 mm to be wet-mixed in acetone at 190 rpm for 700 minutes. The dispersant used was polyvinyl alcohol. The mixed powders were sintered at an ultrahigh pressure and a high temperature as high as 5.1 GPa and 1310° C. respectively. Sintered bodies thus obtained exhibited peaks of the compounds shown in Table 7 in XRD.

The structures of the sintered bodies were photographed under a metallurgical microscope at 1,000 power to observe blackish cBN particles and a whitish bonding phase. The thickness of the bonding phase was measured by drawing an arbitrary straight line on the photographs. The obtained average values and standard deviations of the thickness are shown in Table 7.

The sintered bodies were processed into cutting tools. The tools were then subjected to the cutting test under the conditions described below to measure the life, the time span until the chipping occurs. The obtained results are shown in Table 7.

Cutting test conditions:

Material to be cut: SCM415(JIS Standard), HRC58-62, size: 100 mm in diameter and 300 mm in length, shape: Six V-shaped grooves are provided longitudinally, Tool shape: SNGN120408 chamfer honing (−25°, 0.15–0.2 mm)

Holder: FN11R,

Cutting conditions: V: 190 m/min, d: 0.15 mm, f: 0.11 mm/rev, condition: dry.

TABLE 7

| No. | Compounds constituting the sintered body | Thickness of the bonding phase Average value (μm) | Thickness of the bonding phase Standard deviation (μm) | Tool life (min.) |
|---|---|---|---|---|
| 37 | TiN, TiB$_2$, AlB$_2$, AlN, Al$_2$O$_3$, WC, W | 1.2 | 0.8 | 29 |
| 38 | TiN, TiB$_2$, AlB$_2$, AlN, Al$_2$O$_3$, WC, W, Co$_2$B | 1.3 | 0.8 | 26 |
| 39 | TiC, TiB$_2$, AlB$_2$, AlN, Al$_2$O$_3$, WC, W | 1.1 | 0.7 | 28 |
| 40 | TiZrCN, TiB$_2$, AlB$_2$, AlN, Al$_2$O$_3$, WC, W | 0.9 | 0.7 | 35 |
| 41 | TiN, TaC, TiB$_2$, AlB$_2$, AlN, Al$_2$O$_3$, WC | 1.0 | 0.8 | 30 |
| 42 | TiCN, HfC, TiB$_2$, AlB$_2$, AlN, Al$_2$O$_3$, WC, WCoB | 1.2 | 0.8 | 25 |
| 43 | TiN, CrN, TiB$_2$, AlB$_2$, AlN, Al$_2$O$_3$, WC, NiB | 1.4 | 0.7 | 28 |
| 44 | TiCN, ZrC, ZrN, TiB$_2$, AlB$_2$, AlN, Al$_2$O$_3$, WFeCoB | 1.2 | 0.7 | 26 |

TABLE 8

| No. | Compounds constituting the sintered body | Thickness of the bonding phase Average value (μm) | Thickness of the bonding phase Standard deviation (μm) | Tool life (min.) |
|---|---|---|---|---|
| 45 | TiN, TiB$_2$, AlB$_2$, AlN, Al$_2$O$_3$, WC, W | 0.7 | 0.6 | 30 |
| 46 | TiN, TiB$_2$, AlB$_2$, AlN, Al$_2$O$_3$, WC, W, Co$_2$B | 0.9 | 0.6 | 29 |
| 47 | TiC, TiB$_2$, AlB$_2$, AlN, Al$_2$O$_3$, WC, W | 0.8 | 0.7 | 24 |
| 48 | TiZrCN, TiB$_2$, AlB$_2$, AlN, Al$_2$O$_3$, WC, W | 0.7 | 0.6 | 32 |
| 49 | TiN, TaC, TiB$_2$, AlB$_2$, AlN, Al$_2$O$_3$, WC | 0.8 | 0.5 | 32 |
| 50 | TiCN, HfC, TiB$_2$, AlB$_2$, AlN, Al$_2$O$_3$, WC, WCoB | 0.9 | 0.7 | 28 |
| 51 | TiN, CrN, TiB$_2$, AlB$_2$, AlN, Al$_2$O$_3$, WC, NiB | 0.9 | 0.6 | 24 |
| 52 | TiCN, ZrC, ZrN, TiB$_2$, AlB$_2$, AlN, Al$_2$O$_3$, WFeCoB | 0.8 | 0.5 | 26 |

EXAMPLE 8

Various material powders were mixed for composing bonding phases. Every mixture was heat-treated at 1270° C. for 28 minutes in a vacuum to obtain a compound. The compound was pulverized to produce a bonding-material powder. The bonding-material powder and a cBN powder having an average particle size of 1.8 μm were mixed for the cBN to constitute 64 vol. % by a dispersant-aided ball mill method. The mixing by the BM method was conducted by placing the cBN powder and a bonding-material powder into a pot together with balls having a diameter of 10 mm to be wet-mixed in ethyl alcohol at 245 rpm for 750 minutes. The dispersant added was 1.8 wt. % polyvinyl alcohol. The mixed powders were sintered at an ultrahigh pressure and a high temperature as high as 4.8 GPa and 1330° C. respectively. Sintered bodies thus obtained exhibited peaks of the compounds shown in Table 8 in XRD.

The structures of the sintered bodies were photographed under a metallurgical microscope at 1,000 power to observe blackish cBN particles and a whitish bonding phase. The thickness of the bonding phase was measured by drawing an arbitrary straight line on the photographs. The obtained average values and standard deviations of the thickness are shown in Table 8.

The sintered bodies were processed into cutting tools. The tools were then subjected to the cutting test under the conditions described below to measure the life, the time span until the chipping occurs. The obtained results are shown in Table 8.

Cutting test conditions:

Material to be cut: SCM415(JIS Standard), HRC58-62, size: 100 mm in diameter and 300 mm in length, shape: Six V-shaped grooves are provided longitudinally, Tool shape: SNGN120408 chamfer honing (−25°, 0.15–0.2 mm)

Holder: FN11R,

Cutting conditions: V: 190 m/min, d: 0.15 mm, f: 0.11 mm/rev, condition: dry.

Example 7 yielded the result that every sample had an average value of not more than 1.5 μm and a standard deviation of not more than 0.9 μm in the thickness of the bonding phase and that every sample showed a desirable tool life of about 30 minutes. Similarly, Example 8 yielded the result that every sample had an average value of not more than 1 μm and a standard deviation of not more than 0.7 μm in the thickness of the bonding phase and that every sample showed a desirable tool life of about 30 minutes. The results demonstrate that it is desirable that the bonding phase comprise at least one kind selected from the group consisting of (a) carbide, nitride, carbonitride, or boride of a IVB-, VB-, or VIB group transition metal in the periodic table; (b) nitride, boride, or oxide of Al; (c) at least one kind of carbide, nitride, carbonitride, and boride of Fe, Co, or Ni; and (d) a mutual solid solution of those.

EXAMPLE 9

The following materials were mixed: 70 wt. % titanium nitride, 25 wt. % Al, 3 wt. % Co, and 2 wt. % Ni. The mixture was heat-treated at 1250° C. for 25 minutes in a vacuum to obtain a compound. The compound was pulverized to produce a bonding-material powder. The bonding-material powder exhibited peaks of TiN, Ti$_2$AlN, TiAl$_3$, etc. in XRD. The bonding-material powder and a cBN powder having an average particle size shown in Table 9 were mixed for the cBN to constitute 57 vol. % by the ultrasonic mixing method. The ultrasonic mixing was conducted by adding the cBN powder and the bonding-material powder into ethyl alcohol to be mixed by the action of ultrasonic vibrations at 23 kHz. The mixed powders were sintered at an ultrahigh pressure and a high temperature as high as 4.9 GPa and 1320° C. respectively. All the sintered bodies exhibited cBN, TiN, TiB$_2$, AlB$_2$, AlN, Al$_2$O$_3$, and WC in XRD.

The structures of the sintered bodies were photographed under a metallurgical microscope at 1,500 power to observe blackish cBN particles and a whitish bonding phase. The thickness of the bonding phase was measured by drawing an arbitrary straight line on the photographs. The obtained average values and standard deviations of the thickness are shown in Table 9.

The sintered bodies were processed into cutting tools. The tools were then subjected to the cutting test under the conditions described below to measure the life, the time span until the chipping occurs. The obtained results are shown in Table 9.

Cutting test conditions:
Material to be cut: SCM415, HRC58-62, size: 100 mm in diameter and 300 mm in length, shape: Six V-shaped grooves are provided longitudinally,
Tool shape: SNG432 chamfer honing (−25°, 0.15–0.2 mm)
Holder: FN11R,
Cutting conditions: V: 170 m/min, d: 0.25 mm, f: 0.14 mm/rev, condition: dry.

TABLE 9

| | | Thickness of the bonding phase | | |
|---|---|---|---|---|
| No. | Average particle size of cBN ($\mu$m) | Average value ($\mu$m) | Standard deviation ($\mu$m) | Tool life (min.) |
| 53 | 1.8 | 1.2 | 0.8 | 8 |
| 54 | 2.0 | 1.3 | 0.8 | 27 |
| 55 | 3.6 | 1.1 | 0.7 | 29 |
| 56 | 5.2 | 0.9 | 0.7 | 27 |
| 57 | 6.0 | 0.8 | 0.7 | 24 |
| 58 | 6.4 | 0.6 | 0.7 | 3 |

The results clearly show that cBN particles having an average particle size of 2.0 to 6.0 $\mu$m are capable of prolonging the tool life in high-speed cutting.

EXAMPLE 10

The following materials were mixed: 78 wt. % titanium nitride, 16 wt. % Al, 4 wt. % Co, and 2 wt. % Ni. The mixture was heat-treated at 1260° C., for 20 minutes in a vacuum to obtain a compound. The compound was pulverized to produce a bonding-material powder. The bonding-material powder exhibited peaks of TiN, Ti$_2$AlN, TiAl$_3$, etc. in XRD. The bonding-material powder and a cBN powder having an average particle size shown in Table 10 were mixed for the cBN to constitute 57 vol. % by the ultrasonic mixing method. The ultrasonic mixing was conducted by adding the cBN powder and the bonding-material powder into ethyl alcohol to be mixed by the action of ultrasonic vibrations at 20.5 kHz. The mixed powders were sintered at an ultrahigh pressure and a high temperature as high as 5.0 GPa and 1400° C. respectively. All the sintered bodies exhibited cBN, TiN, TiB$_2$, AlB$_2$, AlN, Al$_2$, O$_3$, and WC in XRD.

The structures of the sintered bodies were photographed under a metallurgical microscope at 1,500 power to observe blackish cBN particles and a whitish bonding phase. The thickness of the bonding phase was measured by drawing an arbitrary straight line on the photographs. The obtained average values and standard deviations of the thickness are shown in Table 10.

The sintered bodies were processed into cutting tools. The tools were then subjected to the cutting test under the conditions described below to measure the life, the time span until the chipping occurs. The obtained results are shown in Table 10.

Cutting test conditions:
Material to be cut: SCM415(JIS Standard), HRC58-62, size: 100 mm in diameter and 300 mm in length, shape: Six V-shaped grooves are provided longitudinally,
Tool shape: SNGN120408 chamfer honing (−25°, 0.15–0.2 mm)
Holder: FN11R,
Cutting conditions: V: 100 m/min, d: 0.21 mm, f: 0.12 mm/rev, condition: dry.

TABLE 10

| | | Thickness of the bonding phase | | |
|---|---|---|---|---|
| No. | Average particle size of cBN ($\mu$m) | Average value ($\mu$m) | Standard deviation ($\mu$m) | Tool life (min.) |
| 59 | 2.1 | 0.9 | 0.6 | 8 |
| 60 | 1.8 | 0.9 | 0.5 | 27 |
| 61 | 1.4 | 0.8 | 0.6 | 29 |
| 62 | 0.9 | 0.8 | 0.5 | 27 |
| 63 | 0.6 | 0.7 | 0.5 | 24 |
| 64 | 0.2 | 0.6 | 0.4 | 28 |
| 65 | 0.008 | 0.5 | 0.3 | 3 |

The results clearly show that cBN particles having an average particle size less than 0.01 $\mu$m and less than 2.0 $\mu$m are capable of prolonging the tool life in ordinary-speed, intermittent cutting.

As explained above, the present invention offers a cBN sintered body superior in wear resistance and chipping resistance. These superior characteristics have been achieved through the reduction in variations of the thickness of the bonding phase in the sintered body.

What is claimed is:

1. A cBN sintered body comprising cBN particles and a bonding phase that bonds the cBN particles, the bonding phase being continuous two-dimensionally;
   the bonding phase comprising at least one material selected from the group consisting of:
      carbide, nitride, carbonitride, or boride of a IVB-, VB-, or VIB-group transition metal in the periodic table;
      nitride, boride, or oxide of Al;
      at least one kind of carbide, nitride, carbonitride, and boride of Fe, Co, or Ni; and
      a mutual solid solution of those;
   the bonding phase having the thickness of which the average value is 1.5 $\mu$m or less and the standard deviation is 0.9 $\mu$m or less;
   the cBN constituting 45 to 70% in volume; and
   the cBN particles having an average particle size of 2 to 6 $\mu$m inclusive.

2. The cBN sintered body as defined in claim 1, wherein the volume percentage of cBN content is in the range of 50 to 65%.

3. A cBN sintered body comprising cBN particles and a bonding phase that bonds the cBN particles, the bonding phase being continuous two-dimensionally;
   the bonding phase comprising at least one material selected from the group consisting of:
      carbide, nitride, carbonitride, or boride of a IVB-, VB-, or VIB-group transition metal in the periodic table;
      nitride, boride, or oxide of Al;
      at least one kind of carbide, nitride, carbonitride, and boride of Fe, Co, or Ni; and
      a mutual solid solution of those;
   the bonding phase having the thickness of which the average value is 1.0 $\mu$m or less and the standard deviation is 0.7 $\mu$m or less;
   the cBN constituting 45 to 70% in volume; and
   the cBN particles having an average particle size of not less than 0.01 $\mu$m and less than 2.0 $\mu$m.

4. The cBN sintered body as defined in claim 3, wherein the volume percentage of cBN content is in the range of 50 to 65%.

* * * * *